United States Patent [19]

Jones

[11] 3,879,328

[45] Apr. 22, 1975

[54] CURABLE COMPOSITIONS OF POLYMERS CONTAINING LABILE HYDROXYL GROUPS

[75] Inventor: Giffin D. Jones, Midland, Mich.

[73] Assignee: The Dow Chemical Company, Midland, Mich.

[22] Filed: July 17, 1972

[21] Appl. No.: 272,442

[52] U.S. Cl. ... 260/29.6 TA; 260/17 R; 260/29.6 H; 260/30.4 R; 260/32.8 R; 260/33.4 R; 260/36.6 UX; 260/80.3 E; 260/80.3 N; 260/80.3 R; 260/80.7; 260/82.1; 260/88.1 P; 260/91.3 R; 260/640; 260/823; 260/844; 117/124 E; 117/132 B; 117/138.8 F; 117/138.8 UA; 117/161 UZ
[51] Int. Cl. .................... C08f 45/24; C08f 45/34
[58] Field of Search ...... 260/91.3 R, 80.3 R, 80.3 N, 260/88.1 P, 82.1, 80.7, 80.73

[56] References Cited
UNITED STATES PATENTS

| 3,038,890 | 6/1962 | Abramo et al. | 260/82.1 |
|---|---|---|---|
| 3,063,975 | 11/1962 | Abramo et al. | 260/80.3 |
| 3,079,369 | 2/1963 | Abramo | 260/80.3 |
| 3,245,954 | 4/1966 | Bergman et al. | 260/66 |

*Primary Examiner*—Stanford M. Levin
*Attorney, Agent, or Firm*—Michael S. Jenkins; Richard G. Waterman

[57] ABSTRACT

Compositions of synthetic polymers containing labile hydroxyl groups such as vinylbenzyl alcohol polymers are efficiently cured by incorporating therein an acid catalyst such as hydrochloric acid or sulfuric acid. The curable compositions containing the acid catalyst are made stable for storing by incorporating therein an amount of water or volatile alcohol which is at least equimolar to labile hydroxyl groups of the polymer. The curable compositions can be stored for substantial periods without curing and then applied as coatings which cure upon volatilization of the alcohol.

7 Claims, No Drawings

CURABLE COMPOSITIONS OF POLYMERS CONTAINING LABILE HYDROXYL GROUPS

BACKGROUND OF THE INVENTION

This invention concerns curable compositions of polymers containing labile hydroxyl groups and an acid catalyst.

Polymers of hydrocarbon monomers such as stryrene and butadiene are known to be useful in applications such as automobile tires, footwear, protective coatings, etc. Due to the relatively poor adhesion of such polymers to metal, wood, glass, fibrous, etc., surfaces, it has been a widespread practice to incorporate certain functional monomers such as hydroxyalkyl acrylates, $\alpha,\beta$-ethylenically unsaturated carboxylic acids and the like into such polymers to provide the desired modification of the polymer. Also it is desirable to render such polymes compatible with melamine-urea resins and to cure such polymers by reacting them with curing agents such as diisocyanates or diisothiocyanates or dibasic acids. Accordingly, it has been a practice to substitute monomers containing labile hydroxyl groups such as vinylbenzyl alcohol for all or part of the hydrocarbon monomers. See, for example, U.S. Pat. No. 3,038,890 and U.S. Pat. No. 3,079,369.

Unfortunately, in curing such polymers with dibasic acids, it is necessary to bake the polymer containing the dibasic acid. And, in curing such polymers with diisocyanates or diisothiocyanates, it is necessary to employ water and alcohol-free curable compositons.

It is therefore highly desirable to provide a composition of a polymer containing labile hydroxyl groups which can be cured under ambient conditions and to provide a curable composition of hydroxyl-containing polymer which can be easily cured when desired.

SUMMARY OF THE INVENTION

In a broad aspect, the present invention is a curable composition which can be cured under ambient conditions which composition comprises a polymer containing labile hydroxyl groups and a catalytic amount of an acid catalyst.

In a narrower aspect, the invention is a shelfstable curable composition comprising a polymer containing labile hydroxyl groups, a catalytic amount of an acid catalyst and a stabilizing amount of water, volatile alcohol or mixture thereof (hereinafter referred to as a volatile hydroxyl component).

The foregoing shelf-stable composition can be stored for long periods without crosslinking and then can be cured by removing the volatile hydroxyl component, e.g., by casting the curable composition as a film and drying to evaporate the volatile alcohol and/or water.

The curable compositions of the invention are particularly useful as coatings for a wide variety of substrates such as metal, wood, plastic, glass, textile fiber, hollow tubes or fibers useful in desalinization and in artificial kidneys. A particularly preferred application involves applications of the curable composition to molded styrene polymer articles followed by curing of the composition and applying other coatings which normally craze the styrene polymer or otherwise cause loss of glossy surface if applied directly to the styrene polymer. As coatings, such compositions provide characteristics such as wash-resistance, antistatic properties, dyeability, anti-thrombogenicity, and water wettability. In addition, coatings of such polymers are useful as bonding layers for adhering generally non-adhering layers, e.g., bonding layer between a photosensitive layer and a film base in photographic films. In addition to their utility as coatings, other applications of the curable compositions include utility in latex foam and urethane foam.

DETAILED DESCRIPTION OF THE EMBODIMENTS

For the purposes of this invention, a polymer containing labile hydroxyl groups is an organic addition polymer in which the hydroxyl groups are attached to benzylic or allylic carbon atoms. Exemplary preferred polymers are addition polymers of at least 2 weight percent of vinylbenzyl alcohol having the general structure:

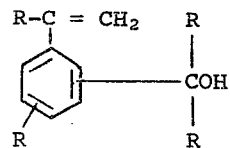

wherein each R is independently hydrogen or methyl. Monomers which are suitably copolymerized with vinylbenzyl alcohols are ethylenically unsaturated monomers. Examples of such comonomers include monovinylidene carbocyclic aromatic monomers such as stryene, $\alpha$-methylstryrene, ar-methylstryrene; ar-(t-butyl)styrene, vinylbenzyl quaternary ammonium compounds such as N,N, N-trimethyl vinylbenzyl ammonium chloride, vinylbenzyl chloride, vinylbenzyl ether of polyglycols and the like. by "monovinylidene carbocyclic aromatic monomer" is meant that to an aromatic carbocylic ring in each molecule of monomer is attached one radical of the formula:

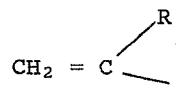

wherein R is hydrogen or lower alkyl having 1 to 4 carbon atoms such as methyl, ethyl, propyl and butyl. Also suitable are conjugated dienes such as butadiene, isoprene, 2-hydroxymethylbutadiene, 2-methoxymethylbutadiene, 2-chloromethylbutadiene and chloroprene; and other vinylic monomers such as vinylpyridines (protonated or quaternized), vinylidene chloride, and similar such monomers which do not contain groups which react with the catalyst such as ester, amide, ketone, nitrile or free amine. Of the quaternized vinylbenzyl amines, those obtained by reacting vinylbenzyl chloride with tertiary amines containing alkyl including benzyl or oxyalkylene groups such as

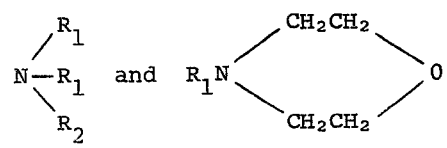

wherein $R_1$ is methyl and $R_2$ is alkyl including benzyl or oxyalkyl having 1 to 7 carbon atoms are preferred. Such preferred vinylbenzyl ammonium compounds are salts having the general structure:

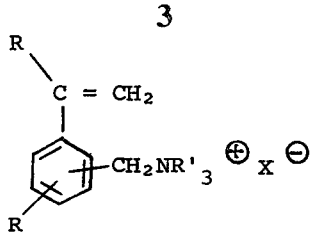

wherein R is independently hydrogen or methyl, R' is alkyl including benzyl or oxyalkyl and X is an anion. Preferred copolymers contain from about 2 to about 10 weight percent of the vinylbenzyl alcohol and from about 10 to about 30 weight percent of the vinylbenzyl quaternary ammonium compounds.

Other suitable labile hydroxyl containing polymers are polymers of 2-hydroxymethylbutadiene, inclusive or copolymers thereof with up to 99 weight percent of one or more of the foregoing comonomers.

Preferred polymers have molecular weights in range from about 10,000 to about 500,000. Those polymers having molecular weights, labile hydroxyl groups and other polar groups sufficient to enable them to cure to form non-tacky coatings and to permit solution of the uncured polymers in alcohols such as t-butyl alcohol or other organic solvents such as toluene, acetone, dioxane or tetrahydrofuran are suitable for the purposes of this invention. Polymers containing from about 2 to about 10 weight percent of the labile hydroxyl comonomer, i.e., vinylbenzyl alcohol and/or 2-hydroxymethyl butadiene, are useful even though no hydroxyl component is employed as stabilizer. Polymers containing about 50 weight percent or more of the labile hydroxyl comonomer should employ stabilizing hydroxyl component unless immediate cure after incorporation of acid catalyst is acceptable.

The polymers containing labile hydroxyl groups are prepared by conventional methods, e.g., polymerization using a free-radical producing catalyst such as peroxides, hydroperoxides, percarbonates, azo compounds and the like. See, for example, U.S. Pat. No. 3,063,975.

The acid catalyst is suitably any acid which will catalyze the reaction of labile alcohols to form ethers and/or to alkylate aromatic rings. Advantageously, the acid catalyst is a strong acid having a pKa less than 3 wherein pKa is the negative logarithm of the acidity constant for the acid. Exemplary acids are sulfuric acid, hydrochloric acid, phosphoric acid, hypophosphorous acid, phosphonic, acids such as chloromethylphosphonic acid, sulfonic acids such as toluene sulfonic acid, oxalic acid, sulfur dioxide and trichloroacetic acid. The acid catalyst is used in amounts sufficient to catalyze the reaction between alcoholic groups of the polymer, preferably in amounts in the range from about 1 to about 10 weight percent based on the polymer.

The hydroxyl component is suitably volatile alcohol, water and mixtures thereof.

The volatile alcohol is an alcohol which volatilizes at temperatures below 150°C, preferably at temperatures less than about 100°C. Exemplary alcohols include methanol, ethanol, n-propanol, isopropyl alcohol, 2-butanol, t-butanol and mixtures thereof. Alternatively water can be substituted for a portion or all of the volatile alcohol; in the latter case water is advantageously employed in combination with a solvent for the polymer such as acetone, dioxane and tetrahydrofuran.

The volatile hydroxyl component is employed in amounts sufficient to stabilize the compositions, i.e., prevent formation of an appreciable number of crosslinkages. Preferably, such amounts are at least equimolar to labile hydroxyl groups of the polymer, most preferably at least three times as many hydroxyl groups in the volatile hydroxyl component as there are labile hydroxyl groups in polymer. In especially preferred compositions the hydroxyl groups of the volatile hydroxyl component are from about three to about nine times as many as the labile hydroxyl groups of the polymer.

The curable composition optionally contains other ingredients such as inert diluents such as toluene, acetone, dioxane, polyglycols and polytriols; modifying resins such as phenol-formaldehyde condensation products; and the usual additives such as fillers, plasticizers, pigments, stabilizers, blowing agents and the like. Of particular interest as additives are plasticizers which do not inhibit cure effected by acid catalyst such as polyglycols, highly methylated or ethylated celluloses containing less than 5 mole percent free hydroxyl, polymethyl vinyl ether, sulfonated polyethylene, and polysulfones. Such plasticizers are advantageously employed in concentrations of 20 weight percent or less based on the hydroxyl-containing polymer.

The compositions are readily prepared by dissolving or dispersing the hydroxyl-containing polymer in the volatile alcohol and subsequently incorporating catalyst therein by any conventional technique for mixing ingredients.

The compositions can be used immediately or stored for long periods and then used. The compositions are readily formed into films, coatings, laminate adhesives and then cured by volatilizing the volatile alcohol which is usually accomplished by heatiing the composition to temperature in range from about 25° to about 100°C.

The following examples are given as illustrations of the invention and should not be construed as limiting its scope. In the examples all parts and percentages are by weight unless otherwise indicated.

EXAMPLE 1

Vinylbenzyl Alcohol Preparation

A 1200-g portion of vinylbenzyl choride is hydrolyzed by adding with stirring, 8% NaOH in water containing 3.5 percent t-butyl alcohol and maintaining resultant stirred mixture at 90°C for 30 hours. After 97 percent of chloride is converted, a crude product consisting essentially of 81.2 percent vinylbenzyl alcohol, 15.1 vinylbenzyl ether and 2.5 percent vinylbenzyl chloride is recovered. The vinylbenzyl alcohol is recovered from the crude product by distillation. Analysis of the recovered vinylbenzyl alcohol product indicates more than 98 percent vinylbenzyl alcohol, less than 0.7 percent vinylbenzyl chloride, less than 10 ppm of vinylbenzyl ether and approximately 0.12 percent α-chlorovinyltoluene and 0.51% β-chlorovinyltoluene.

Vinylbenzyl Alcohol Polymerization

In a 25-g portion of t-butyl alcolol is dissolved 22 g of the vinylbenzyl alcohol obtained by the foregoing procedure and 50 milligrams of azo-bis-isobutyronitrile. The solution is purged with nitrogen and heated overnight in a water bath at 70°C. The polymerization product is a +47 percent poly(vinylbenzyl alcohol) solution having the appearance of a clear, colorless, viscous polymerizate. The polymer is recovered and is found to dissolve in ethanol, propanol and t-butyl alcohol to give a clear solution and in methanol to give a slightly turbid solution. The relative viscosity of a solution of 5.6 g per 100 ml of solvent is 1.616 in methanol and 5.173 in t-butyl alcohol.

Curing of Vinylbenzyl Alcohol Polymer

A 5-g portion of the polymerization product is diluted with 10 g of methanol. A 0.07-g portion of p-toluenesulfonic acid monohydrate is added to 2 g of the polymer solution and is coated on glass and on extruded polystyrene containing about 5 percent polybutadiene. To a 2-g portion of polymer solution which has been diluted with an equal volume of methanol is added 0.061 g of p-toluene sulfonic acid monohydrate. The resulting composition is coated on compression molded polystyrene. After drying at room temperature, the coatings are insoluble in methanol. The remaining portion of the polymer solution is allowed to stand for 2 weeks at room temperature. No curing of the polymer is observed in the polymer solution.

For purposes of comparison, a 5-g portion of the polymerizate is diluted with 10 g of dioxane, treated with p-toluene sulfonic acid monohydrate and allowed to stand for 2 weeks. Gelation of the previously fluid solution indicates substantial curing has occurred. The gel is found to be insoluble in methanol.

EXAMPLE 2

A 2.149-g portion of vinylbenzyl alcohol, 0.877 g of 2-methoxymethylbutadiene and 0.014 g of azo-bis-isobutyronitrile are dissolved in 2.227 g of t-butyl alcohol. The resultant solution is purged with nitrogen and heated at 60°C for 2 days. The polymerization product is a viscous, clear, colroless liquid. A cured film is flexible whereas a film of the homopolymer of vinylbenzyl alcohol is rigid. A remaining portion of an alcoholic solution of the copolymer and acid catalyst forms essentially no crosslinkages after standing for several days. A vinylbenzyl alochol/2-methoxymethyl butadiene copolymer is confirmed.

The resulting copolymer is cast as a film and cured in accordance with the curing procedure of Example 1.

EXAMPLE 3

A 3.165-g portion of the polymerization product of Example 1 and 0.655 g of an aqueous solution (50 percent) of poly(methylvinyl ether) are dissolved in 10 g of t-butyl alcohol containing 0.100 g of p-toluenesulfonic acid monohydrate. Enough methanol is added to give a 2:1 weight ratio of t-butanol to methanol. The solution is stirred and coated on glass, polystyrene and impact polystyrene. After drying overnight the films are clear, colorless, insoluble in methanol and non-brittle.

EXAMPLE 4

A copolymer latex is prepared by rotating a bottle containing the following ingredients at 20 rpm and 20°C for 16 hours:

| Ingredient | Grams |
| --- | --- |
| styrene | 30.0 |
| butadiene | 24.0 |
| vinylbenzyl alcohol | 6.0 |
| lauryl mercaptan | 0.6 |
| sodium persulfate | 0.3 |
| toluene | 30.0 |
| water | 97.1 |
| sodium lauryl sulfate | 1.2 |

The copolymer product is precipitated from the latex by adding methanol and is recovered and redissolved in dioxane to give 540 g of 10.2 percent solution of the copolymer.

To an 0.88-g portion of the copolymer solution is added 50 mg of p-toluene sulfonic acid monohydrate. The solution does not gel overnight on standing, but a film cast and allowed to dry overnight does not dissolve in dioxane although dioxane does cause the film to swell somewhat. The film also does not dissolve in a mixture of dioxane and t-butyl alcohol containing hydrochloric acid.

A similar film cast from a solution of the copolymer containing no p-toluenesulfonic acid does dissolve in the mixture of t-butyl alcohol and dioxane containing hydrochloric acid.

EXAMPLE 5

A 20.5-g portion of vinylbenzyl alcohol and 2 g of vinylbenzyltrimethylammonium choride are dissolved in 30 ml of methanol containing 0.33 g of azo-bis-isobutyronitrile. The resulting solution is purged with nitrogen and heated at 80°C for 16 hours. The resulting viscous solution is evaporated and the residue is leached with ether and water. Upon drying there is obtained a 4-g yield of white solid copolymer. The copolymer is soluble in methanol and in t-butyl alcohol containing 20 percent water. The copolymer is readily cured by adding p-toluene sulfonic acid monohyrdrate or hydrochloric acid and drying to remove methanol. A curable composition of 0.51 g of the copolymer and 0.15 g of 50 percent polymethylvinyl ether in 11.6 g of t-butyl alcohol and 2.5 g of water can be applied to a polymeric substrate such as polyethylene terephthalate film and cured to a wash-resistant, antistatic coating. The resulting 0.6 mil film of the curable composition on a 5 mil polyethylene terephthalate film is charged using corona discharge (DC 6,000 volts) at 17 percent relative humidity to provide an initial charge of 400 volts. After 1.1 minutes, the charge has decayed to one-half of the initial charge, and after 3 minutes total, the charge has decayed to one-third of the initial charge. A similarly charged blank polyethylene terephthalate film exhibits no charge decay in the aforementioned time periods.

EXAMPLE 6

The vinylbenzyl alcohol homopolymer of Example 1 is dissolved in dioxane to form a 10.93 percent solution of the homopolymer. To a 0.941-g portion of the polymer solution is added 0.015 g of p-toluene sulfonic acid monohydrate and 0.168 g of t-butyl alcohol. The molar ratio of the t-butyl alcohol to hydroxyl groups of the polymer is 2.96:1. The resultant solution is stored for more than 4 weeks without exhibiting any evidence of gelation.

A similar solution containing about 0.97 mole of t-butyl alcohol per mole of hydroxyl groups of polymer gels after 7 days. A control solution containing no t-butyl alcohol gels within one day.

EXAMPLE 7

The vinylbenzyl homopolymer of Example 1 is dissolved in dioxane to form a 10.93 percent solution of the homopolymer. The solution is divided into several portions and to each portion is added an acid catalyst as set forth in Table I. The portions of polymer solution are cast as films and are air dried overnight. The films are tested for degree of curing by attempting to dissolve them in t-butyl alcohol (t-BuOH) and mixture of 0.5 ml of 36 percent aqueous HCl in 50 ml of t-butyl alcohol (t-BuOH+HCl). The results are recorded in Table I.

TABLE 1

| Sample No. | Amount of Polymer | Acid Catalyst Type | Amount | Solubility (1) t-BuOH | t-BuOH + HCL |
|---|---|---|---|---|---|
| 1 | 0.861 | oxalic | 0.035 | Not Soluble | Not Soluble |
| 2 | 0.654 | phosphoric | 0.183 | Not Soluble | Soluble |
| 3 | 0.627 | ethyl phosphoric | 0.092 | Not Soluble | Soluble |
| 4 | 0.754 | chloromethyl phosphoric | 0.079 | Not Soluble | Not soluble |
| 5 | 0.393 | hypophosphorous (31%) | 0.100 | Not Soluble | Not Soluble |
| 6 | 0.401 | trifluoroacetic | 0.034 | Not Soluble | Soluble |
| 7 | 0.446 | pentachlorobenzoic | 0.033 | Not Soluble | Soluble |
| 8 | 0.41 | chloroacetic | 0.044 | Not Soluble | Soluble |
| 9 | 0.46 | phosphorous | 0.047 | Not Soluble | Not Soluble |
| 10 | 0.568 | trichloroacetic | 0.142 | Not Soluble | Not Soluble |
| 11 | 0.838 | phenylphosphinic | 0.031 | Not Soluble | Soluble |

(1) Soluble indicates formation of a homogeneous solution. Not soluble indicates only slight swelling occurs.

EXAMPLE 8

A curable composition of 0.0986 g of vinylbenzyl alcohol homopolymer, 0.033 g of p-toluene sulfonic acid and 0.038 g of water in 3.71 g of dioxane is allowed to stand at room temperature for several days. No gellation is observed for more than 7 days of standing. A similar composition containing no water gels within 1 day.

EXAMPLE 9

A copolymer latex is made similar to that of Example 4 except that the emulsifier is polyoxyethylene oleyl methyl ammonium chloride (2.5 g) and having a total of 15 units of oxyethylene existing as two groups bonded to nitrogen and the catalyst is azo-bis-isobutyramidine hydrochloride (0.3 g). The latex solids concentration is 31 percent. A wetting agent (di-sec-butylphenyl mono ether of polyethylene glycol having an average of ten units) is added to the latex in amount sufficient to yield 7.4 percent of wetting agent on basis of copolymer weight. Sulfur dioxide is introduced into the latex to lower the pH to 0.5.

Tensile bars of polystyrene and impact polystyrene are coated with the latex at a coating weight of approximately 3 mg cm$^{-2}$. the coatings are cured at 70°–75°C for an hour. The time for stress cracking at 650 psi is determined after the application of margarine. Uncoated samples break in 60 to 66 minutes. The coated samples break after 2.4 to 4.2 hours in the case of polystyrene or after 4.9 to 6.3 hours in the case of impact polystyrene. These times are longer than those observed when coatings of ordinary styrene/butadiene copolymer latex are employed. In addition, the coating of the vinylbenzyl alcohol copolymer latex is less tacky than coatings of styrene/butadiene copolymer latex.

EXAMPLE 10

Vinylbenzyl alcohol (9.15 g) is dissolved in t-butyl alcohol (12.5 g) containing the mono vinylbenzyl ether of a 40 unit polyethylene oxide (9.03 g) and azo-bis-isobutyronitrile (0.5 g). After heating overnight at 60°C the polymer is precipitated in acetone. A yield of 5 g of pale yellow rubbery solid is obtained. A solution of 0.308 g in 10 percent aqueous t-butyl alcohol is treated with p-toluene sulfonic acid and a film is cast on polystyrene. After air drying overnight, the film is hard, non-tacky and insoluble.

EXAMPLE 11

The making of polymers containing vinylbenzyl alcohol or 2-hydroxymethyl butadiene is alternatively accomplished by polymerization of vinylbenzyl chloride or 2-chloromethylbutadiene with in situ hydrolysis. In situ hydrolysis is confirmed by W. G. Lloyd and J. F. Vitkuske, J. App. Poly. Sci. 6 557 (1962).

As an illustration of this technique, emulsion copolymerization of vinylbenzyl chloride with styrene and butadiene is carried out as follows: The following recipe is adjusted to pH 2.5.

| Polymerization Recipe | Weight Parts Dry Weight | Wet Weight |
|---|---|---|
| vinylbenzyl chloride | 108 | 108 |
| styrene | 189 | 189 |
| butadiene | 243 | 243 |
| water | — | 616 |
| seed latex* | 20 | 100 |
| azo-bis-isobutyroamidine dihydrochloride | 2.7 | 2.7 |
| dodecyltrimethylammonium chloride | 21.6 | 21.6 |

*The seed latex is a styrene polymer latex of 20% solids concentration and average particle size of 330A.

The polymerization is 92 percent complete after agitation at 250 rpm for 6 hours at 90°C. The pH drops to 0.95. After steam distillation to remove monomers, the latex contains 41.1% solids and has pH 0.9. The average particle size of the latex is 1,490 A. About 15 percent of the vinylbenzyl chloride used initially is hydrolyzed to vinylbenzyl alcohol.

This latex is then reacted with trimethylamine and coated on 5 mil polyethylene terephthalate film. After air drying, the sheets are washed in water and charged to about 400 volts with a corona discharge (DC 6,000 volts). The charge decay is measured at 17 percent relative humidity.

| amination % | film thickness mil | charge decay half life, min. |
|---|---|---|
| 97 | 0.6 | 75.5 |
| 85 | 0.5 | 75.5 |
| 76 | 0.4 | 168 |

What is claimed is:

1. A curable composition consisting essentially of a polymer containing labile hydroxyl groups, a catalytic amount of an acid catalyst and a hydroxyl component selected from the group consisting of a volatile alcohol having from 1 to 4 carbon atoms, water or mixture thereof in an amount sufficient to stabilize the composition against the formation of crosslinkages, said polymer being a polymer of at least 2 weight percent of (1) a labile hydroxyl monomer selected from the group consisting of (a) vinylbenzyl alcohol having the general structure:

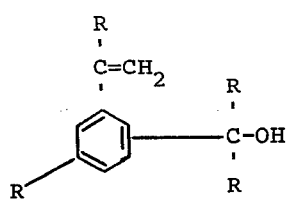

wherein each R independently is hydrogen or methyl, (b) 2-hydroxymethylbutadiene or (c) mixtures thereof and (2) a remaining amount of one or more ethylenically unsaturated monomers that are inert to the acid catalyst.

2. The curable composition of claim 1 wherein the amount of hydroxyl component is sufficient to provide at least 3 hydroxyl groups in the hydroxyl component per labile hydroxyl group in the polymer, said labile hydroxyl group being attached to a benzylic or allylic carbon atom.

3. The composition according to claim 1, wherein the polymer is an addition polymer of at least about 50 weight percent of vinylbenzyl alcohol represented by the structure:

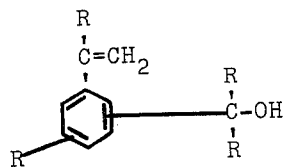

wherein each R independently is hydrogen or methyl and from 0 to about 50 weight percent of one or more ethylenically unsaturated monomers that are inert to the acid catalyst.

4. The composition according to claim 3 wherein the ethylenically unsaturated monomer comprises monovinylidene aromatic carbocyclic monomer.

5. The composition according to claim 1 wherein the ethylenically unsaturated monomer comprises conjugated diene.

6. The composition according to claim 1 wherein the ethylenically unsaturated monomer comprises vinylbenzyl quaternary ammonium compound.

7. A curable composition consisting of a polymer containing labile hydroxyl groups, a catalytic amount of an acid catalyst and a hydroxyl component selected from the group consisting of a volatile alcohol having from 1 to 4 carbon atoms, water or mixture thereof in an amount sufficient to stabilize the composition against the formation of crosslinkages, said polymer being a polymer of at least 2 weight percent of (1) a labile hydroxyl monomer selected from the group consisting of (a) vinylbenzyl alcohol having the general structure:

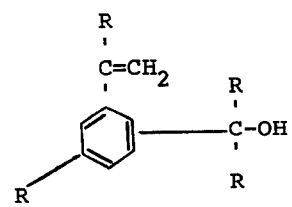

wherein each R independently is hydrogen or methyl, (b) 2-hydroxymethylbutadiene or (c) mixtures thereof and (2) a remaining amount of one or more ethylenically unsaturated monomers that are inert to the acid catalyst.

* * * * *